(12) United States Patent
Gilbert et al.

(10) Patent No.: US 6,759,953 B2
(45) Date of Patent: Jul. 6, 2004

(54) VEHICLE SAFETY FLASHER SYSTEM

(76) Inventors: Sylvie S. Gilbert, #14-230 Wigle Avenue, Kingsville, Ontario (CA), N9Y 2J9; Antoine T. Macksoud, P.O. Box 74, Kingsville, Ontario (CA), N9Y 2E8

( * ) Notice: Subject to any disclaimer, the term of this patent is extended or adjusted under 35 U.S.C. 154(b) by 0 days.

(21) Appl. No.: 10/435,205

(22) Filed: May 12, 2003

(65) Prior Publication Data

US 2003/0201887 A1 Oct. 30, 2003

Related U.S. Application Data

(63) Continuation of application No. 09/162,082, filed on Sep. 28, 1998, now abandoned.

(51) Int. Cl.[7] ................................................. B60Q 1/44
(52) U.S. Cl. ........................ 340/479; 340/467; 340/471
(58) Field of Search ................................. 340/463, 464, 340/466, 467, 468, 471, 475, 479

(56) References Cited

U.S. PATENT DOCUMENTS

| | | | |
|---|---|---|---|
| 3,708,782 A | 1/1973 | Mori | |
| 4,231,013 A | 10/1980 | Freeman et al. | |
| 4,418,331 A | * 11/1983 | Chicoine | 340/479 |
| 4,916,431 A | * 4/1990 | Gearey | 340/479 |
| 4,918,424 A | 4/1990 | Sykora | |
| 5,111,181 A | 5/1992 | Priesemuth | |
| 5,210,522 A | 5/1993 | Hoekman et al. | |
| 5,376,918 A | 12/1994 | Vinciguerra et al. | |
| 5,495,226 A | 2/1996 | Vowell | |
| 5,504,472 A | * 4/1996 | Wilson | 340/479 |
| 5,606,310 A | 2/1997 | Egger et al. | |
| 5,638,045 A | 6/1997 | Byrd | |
| 5,886,628 A | * 3/1999 | Alhassoon | 340/479 |

\* cited by examiner

*Primary Examiner*—Van T. Trieu
(74) *Attorney, Agent, or Firm*—Dickstein Shapiro Morin & Oshinsky LLP

(57) ABSTRACT

There is provided a safety flasher system for a vehicle having a brake pedal, brake lights, an emergency flasher switch, and emergency flasher lights. The system is to be operable during a panic stop or a brake failure, and comprises: a first switch, which is electrically coupled to the brake lights and operable to activate the brake lights when the brake pedal is depressed under normal braking conditions; a second switch electrically coupled to the emergency flasher lights and operable to activate the emergency flasher lights when the brake pedal is depressed under severe braking conditions; a holding relay electrically coupled to the second switch for holding the emergency flasher lights in the activated mode; and an electrical coupling between the second switch, the holding relay and the emergency flasher switch wherein the emergency flasher lights are deactivated by moving the emergency flasher switch to an on position followed by moving the emergency flasher switch to an off position.

1 Claim, 1 Drawing Sheet

VEHICLE SAFETY FLASHER SYSTEM

This application is a continuation of application Ser. No. 09/162,082, filed Sep. 28, 1998 was abandoned, the entire disclosure of which is incorporated herein by reference.

FIELD OF THE INVENTION

The present invention relates to the field of vehicle accessories, and more particularly to a vehicle safety flasher system to be operable during a panic stop or a brake failure.

BACKGROUND OF THE INVENTION

As can be seen by reference to the following U.S. Pat. Nos. 5,638,045; 5,495,226; 5,376,918; 5,210,522; 5,111,181; 4,918,424; 3,708,782; 4,990,886; 5,606,310; and 4,231,013 the prior art is replete with myriad and diverse devices for indicating the braking of a vehicle.

In particular, U.S. Pat. No. 4,990,886 to Stanulis discloses an automotive alarm system that provides the driver of a following vehicle with two different brake signals related to the foot pressure that the driver of the leading vehicle is applying to his brake pedal; the two brake signals being continually illuminating and flashing. However, the system according to this patent requires additional lamps to be provided to the vehicle. In addition, it appears that for the emergency flasher lights to remain continuously in activated mode, the user of the vehicle should maintain the pressure on the brake pedal; the emergency flasher lights are deactivated once the brake pedal is released. This might present a major disadvantage on the safety of the system, particularly when the user is no longer in condition to maintain such pressure on the brake pedal as a result of a shock, for example. The disclosure of the Stanulis patent does not provide any teachings as to how the emergency flasher lights might be turned in deactivated mode.

While all of the aforementioned prior art constructions are more than adequate for the basic purpose and function for which they have been specifically designed, they are uniformly deficient with respect to their failure to provide a simple, efficient, and practical vehicle safety flasher system.

As a consequence of the foregoing situation, there has existed a longstanding need for a new and improved vehicle safety flasher system and the provision of such a construction is a stated objective of the present invention.

BRIEF SUMMARY OF THE INVENTION

The invention provides a safety flasher system for a vehicle having a brake pedal, brake lights, an emergency flasher switch, and emergency flasher lights. The system is to be operable during a panic stop or a brake failure, and comprises: a first switch, which is electrically coupled to the brake lights and operable to activate the brake lights when the brake pedal is depressed under normal braking conditions; a second switch which is electrically coupled to the emergency flasher lights and operable to activate the emergency flasher lights when the brake pedal is depressed under severe braking conditions; a holding relay which is electrically coupled to the second switch for holding the emergency flasher lights in the activated mode; and an electrical coupling between the second switch, the holding relay and the emergency flasher switch wherein the emergency flasher lights are deactivated by moving the emergency flasher switch to an on position followed by moving the emergency flasher switch to an off position.

Preferably, the holding relay holds the emergency flasher lights continuously in activated mode, even when the brake pedal is released. The emergency flasher lights are deactivated manually by moving the emergency flasher switch to an on position, then to an off position.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
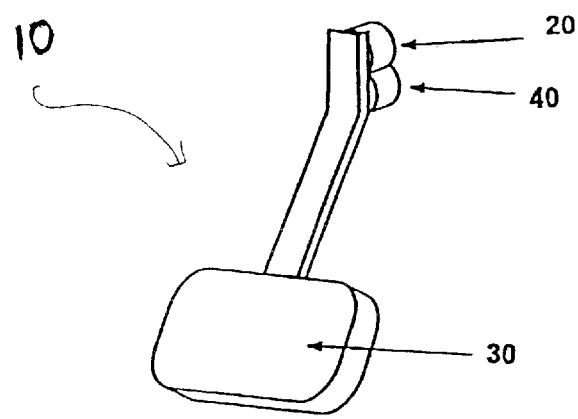
FIG. 1 is a perspective view of a vehicle brake pedal embodying the safety flasher system according to the invention.
Figure 2:
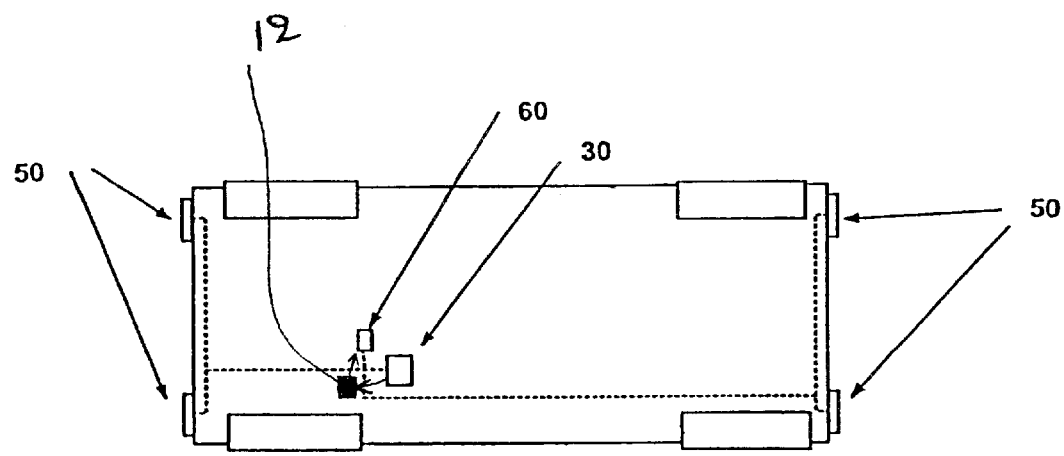
FIG. 2 is a schematic illustration of the safety flasher system according to the invention.

As can be seen by reference to the drawings, and in particularly to FIG. 1, vehicle safety flasher system that forms the basis of the present invention is designated generally by the reference number 10. The safety flasher system 10 consists of a replacement brake light switch assembly with a double switch arrangement. One switch 20 controls the brake lights in the normal fashion, allowing them to come on anytime the brake pedal 30 is depressed. The second switch 40 activates the vehicle's four-way emergency flasher lights 50 at any point that the brake pedal 30 is depressed in an abnormal manner, such as when making a very hard or fast stop. In normal situations, a brake pedal 30 is depressed lightly to moderately. When in a panic stop, it is pushed much harder, activating the emergency flasher lights. The emergency flasher lights 50 stay on until the brake pedal 30 is released.

In a preferred embodiment, the safety flasher system 10 may include an incorporated holding relay 12 that causes the emergency flasher lights 50 to say on until they were deactivated manually by turning the normal flasher switch 60 on, then off. The holding relay 12 is energized by the activated flasher circuitry, so it does not de-energize until the emergency flasher lights 50 are turned on, then off again. This feature is very useful in the event that a vehicle leaves the road and goes off an embankment or into heavy brush, etc. where the vehicle is not easily seen or noticed by passing motorists. Having the emergency flasher lights 50 activated continuously may very well be the factor that would cause help to arrive at the scene. Indeed, the user of the vehicle in such condition might no longer be in a position to maintain the pressure on the brake pedal, as a result of shock. The safety flasher system 10 may be manufactured as required to fit any vehicle.

The concept of the safety flasher system 10 is that of a secondary switch incorporated into the brake light switch for a vehicle that activates the vehicles four-way emergency flashers when involved in an abnormal braking situation such as a panic stop. The safety flasher system 10 is easily adapted to any vehicle and provides a very important safety feature which may prevent countless accidents that would likely result in property damage and personal injury or death.

Although only an exemplary embodiment of the invention has been described in detail above, those skilled in the art will readily appreciate that many modifications are possible without materially departing form the novel teachings and advantages of this invention. Accordingly, all such modifications are intended to be included within the scope of this invention as defined in the following claims.

We claim as our invention:

1. A safety flasher system for a vehicle having a brake pedal, brake lights, an emergency flasher switch, and emergency flasher lights, the system being operable during a panic stop or a brake failure, and comprising:

a first switch electrically coupled to the brake lights and operable to activate the brake lights when the brake pedal is depressed under normal braking conditions;

a second switch electrically coupled to the emergency flasher lights and operable to activate the emergency flasher lights when the brake pedal is depressed under severe braking conditions;

a holding relay electrically coupled to the second switch for holding the emergency flasher lights in activated mode; and an electrical coupling between the second switch, the holding relay and the emergency flasher switch wherein the emergency flasher lights are deactivated by moving the emergency flasher switch to an on position followed by moving the emergency flasher switch to an off position.

* * * * *